US012670697B1

(12) United States Patent
Keselman et al.

(10) Patent No.: US 12,670,697 B1
(45) Date of Patent: Jun. 30, 2026

(54) IMAGE RECOGNITION USING MACHINE LEARNING MODELS WITH MASKED CLASSIFICATION LAYERS

(71) Applicant: Amazon Technologies, Inc., Seattle, WA (US)

(72) Inventors: Jose Ariel Keselman, Kyriat Tivon (IL); Eyal Itzhak Nitzany, Gilon (IL)

(73) Assignee: Amazon Technologies, Inc., Seattle, WA (US)

( * ) Notice: Subject to any disclaimer, the term of this patent is extended or adjusted under 35 U.S.C. 154(b) by 234 days.

(21) Appl. No.: 18/541,269

(22) Filed: Dec. 15, 2023

(51) Int. Cl.
| | |
|---|---|
| *G06V 10/764* | (2022.01) |
| *G06V 10/26* | (2022.01) |
| *G06V 10/40* | (2022.01) |
| *G06V 10/774* | (2022.01) |
| *G06V 10/82* | (2022.01) |
| *G06V 40/10* | (2022.01) |

(52) U.S. Cl.
CPC ............ *G06V 10/764* (2022.01); *G06V 10/26* (2022.01); *G06V 10/40* (2022.01); *G06V 10/774* (2022.01); *G06V 10/82* (2022.01); *G06V 40/107* (2022.01)

(58) Field of Classification Search
CPC ...... G06V 10/26; G06V 10/40; G06V 10/764; G06V 10/774; G06V 10/82; G06V 40/107
See application file for complete search history.

(56) References Cited

U.S. PATENT DOCUMENTS

| | | | |
|---|---|---|---|
| 7,225,980 | B2 | 6/2007 | Ku et al. |
| 7,949,568 | B2 | 5/2011 | Fano et al. |
| 8,009,864 | B2 | 8/2011 | Linaker et al. |
| 8,175,925 | B1 | 5/2012 | Rouaix |
| 8,189,855 | B2 | 5/2012 | Opalach et al. |
| 8,423,431 | B1 | 4/2013 | Rouaix et al. |

(Continued)

FOREIGN PATENT DOCUMENTS

| | | | | |
|---|---|---|---|---|
| WO | WO-2025075604 | A1 | * 4/2025 | ............. G06N 3/045 |

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Jennifer Mehmood
*Assistant Examiner* — Jose M Torres
(74) *Attorney, Agent, or Firm* — Athorus, PLLC

(57) ABSTRACT

A machine learning model may be trained to detect items depicted within images captured in a materials handling facility. Activations generated in response to inputs including images are provided to a masking component programmed with a support set including identifiers of items, such as items within a field of view of a camera that captured the images. The masking component converts activations corresponding to items not in the support set to significantly negative values, such as negative infinity, while leaving activations corresponding to items in the support set unchanged. Activations corresponding to items that are in the support set and not in the support set are then processed to generate probabilities that the images depict one of such items, with the significantly negative values of activations corresponding to items not in the support set resulting in probabilities of zero.

20 Claims, 13 Drawing Sheets

(56) References Cited

U.S. PATENT DOCUMENTS

| | | | | |
|---|---|---|---|---|
| 8,630,924 | B2 | 1/2014 | Groenevelt et al. | |
| 8,688,598 | B1 | 4/2014 | Shakes et al. | |
| 9,473,747 | B2 | 10/2016 | Kobres et al. | |
| 9,892,344 | B1 * | 2/2018 | Tran | G06F 18/24 |
| 10,650,432 | B1 * | 5/2020 | Joseph | G06Q 30/0631 |
| 10,726,334 | B1 * | 7/2020 | Elnahrawy | G06N 3/045 |
| 2003/0002712 | A1 | 1/2003 | Steenburgh et al. | |
| 2004/0181467 | A1 | 9/2004 | Raiyani et al. | |
| 2008/0055087 | A1 | 3/2008 | Horii et al. | |
| 2008/0077511 | A1 | 3/2008 | Zimmerman | |
| 2008/0109114 | A1 | 5/2008 | Orita et al. | |
| 2009/0121017 | A1 | 5/2009 | Cato et al. | |
| 2009/0245573 | A1 | 10/2009 | Saptharishi et al. | |
| 2011/0011936 | A1 | 1/2011 | Morandi et al. | |
| 2012/0284132 | A1 | 11/2012 | Kim et al. | |
| 2013/0076898 | A1 | 3/2013 | Philippe et al. | |
| 2013/0253700 | A1 | 9/2013 | Carson et al. | |
| 2014/0279294 | A1 | 9/2014 | Field-Darragh et al. | |
| 2015/0019391 | A1 | 1/2015 | Kumar et al. | |
| 2015/0073907 | A1 | 3/2015 | Purves et al. | |
| 2017/0076224 | A1 * | 3/2017 | Munawar | G06N 3/084 |
| 2019/0114804 | A1 * | 4/2019 | Sundaresan | G06T 7/74 |
| 2021/0232865 | A1 * | 7/2021 | Munoz Delgado | G06N 3/0464 |
| 2022/0148289 | A1 * | 5/2022 | Liu | G06N 7/01 |
| 2024/0193484 | A1 * | 6/2024 | Misawa | G06N 5/025 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

* cited by examiner

MODEL PROGRAMMED WITH MASKING
COMPONENT

PROBABILITY DISTRIBUTION GENERATED FROM MASKED ACTIVATIONS

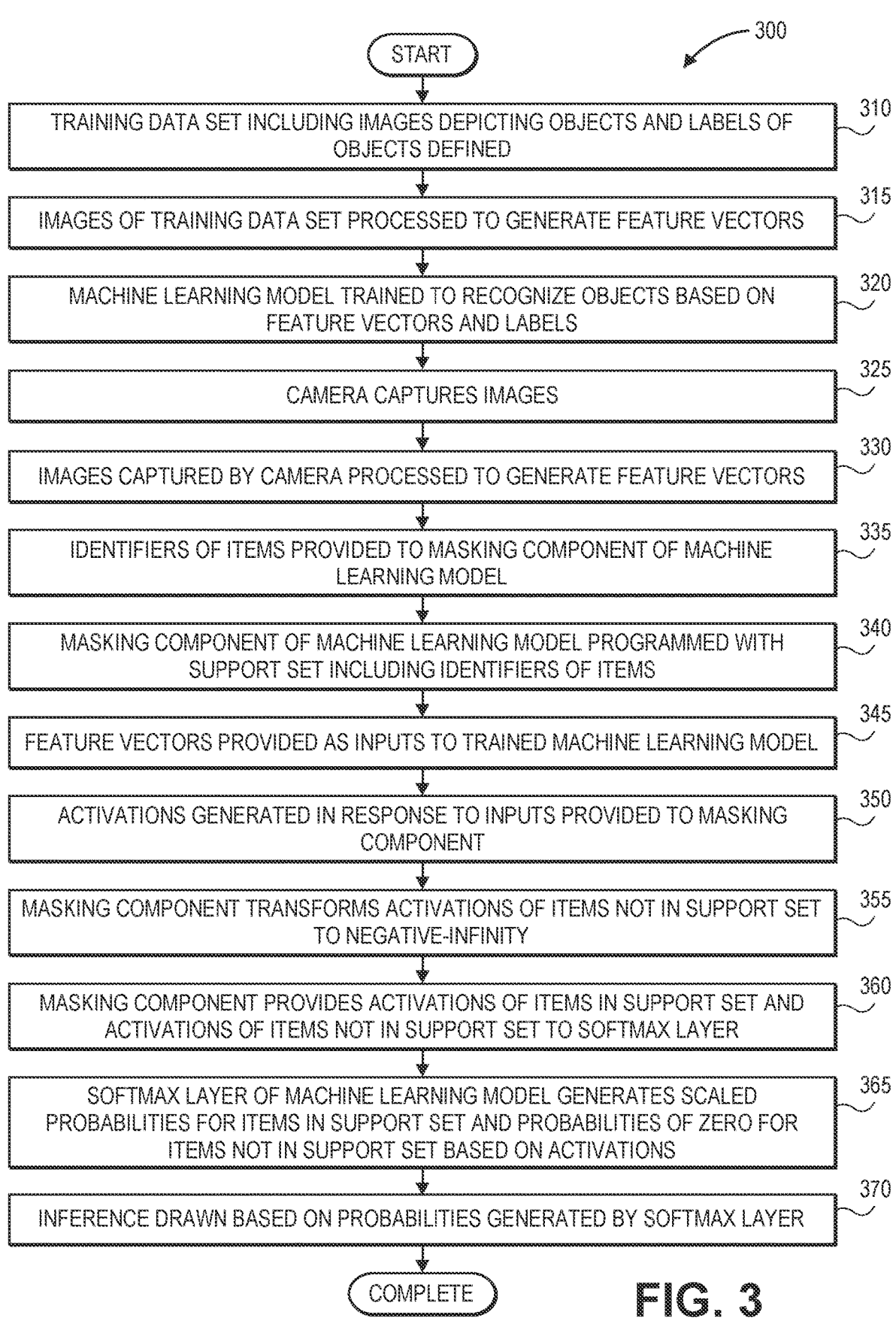

START

300

TRAINING DATA SET INCLUDING IMAGES DEPICTING OBJECTS AND LABELS OF OBJECTS DEFINED — 310

IMAGES OF TRAINING DATA SET PROCESSED TO GENERATE FEATURE VECTORS — 315

MACHINE LEARNING MODEL TRAINED TO RECOGNIZE OBJECTS BASED ON FEATURE VECTORS AND LABELS — 320

CAMERA CAPTURES IMAGES — 325

IMAGES CAPTURED BY CAMERA PROCESSED TO GENERATE FEATURE VECTORS — 330

IDENTIFIERS OF ITEMS PROVIDED TO MASKING COMPONENT OF MACHINE LEARNING MODEL — 335

MASKING COMPONENT OF MACHINE LEARNING MODEL PROGRAMMED WITH SUPPORT SET INCLUDING IDENTIFIERS OF ITEMS — 340

FEATURE VECTORS PROVIDED AS INPUTS TO TRAINED MACHINE LEARNING MODEL — 345

ACTIVATIONS GENERATED IN RESPONSE TO INPUTS PROVIDED TO MASKING COMPONENT — 350

MASKING COMPONENT TRANSFORMS ACTIVATIONS OF ITEMS NOT IN SUPPORT SET TO NEGATIVE-INFINITY — 355

MASKING COMPONENT PROVIDES ACTIVATIONS OF ITEMS IN SUPPORT SET AND ACTIVATIONS OF ITEMS NOT IN SUPPORT SET TO SOFTMAX LAYER — 360

SOFTMAX LAYER OF MACHINE LEARNING MODEL GENERATES SCALED PROBABILITIES FOR ITEMS IN SUPPORT SET AND PROBABILITIES OF ZERO FOR ITEMS NOT IN SUPPORT SET BASED ON ACTIVATIONS — 365

INFERENCE DRAWN BASED ON PROBABILITIES GENERATED BY SOFTMAX LAYER — 370

COMPLETE

FIG. 3

IMAGE RECOGNITION USING MACHINE LEARNING MODELS WITH MASKED CLASSIFICATION LAYERS

BACKGROUND

Many image recognition techniques rely on the use of machine learning models in general, and artificial neural networks in particular. An artificial neural network, such as a convolutional neural network, may play a valuable role in processing and characterizing imaging data captured by cameras or other imaging devices, and detecting and classifying objects depicted therein. An artificial neural network may be trained using a data set of images depicting objects and labels of such images, which identify a class of objects to which the depicted objects belong. When an artificial neural network is trained, e.g., in a supervised manner, synaptic weights and biases or other internal parameters are adjusted by optimization techniques to enable the artificial neural network to most accurately recognize objects according to one or more loss functions.

Image recognition techniques are used in a variety of applications, including but not limited to commercial applications. For example, cameras or other imaging devices are frequently used in bricks-and-mortar commercial settings. In a materials handling facility, such as a retail store or establishment, a camera may be provided in one or more locations and configured to include portions of the materials handling facility within its field of view. Images captured by the digital camera may be processed to identify one or more customers or other personnel within the materials handling facility, to detect movements of such customers or personnel, or to identify items that are removed from storage units by such customers or personnel, or placed on such storage units by such customers or personnel.

BRIEF DESCRIPTION OF THE DRAWINGS

FIGS. 1A through 1I are views of aspects of one system for image recognition using computer vision in accordance with embodiments of the present disclosure.

FIG. 3 is a flow chart of one process for image recognition in accordance with embodiments of the present disclosure.

DETAILED DESCRIPTION

As is set forth in greater detail below, the present disclosure is directed to image recognition techniques that rely on artificial neural networks. More particularly, implementations of the present disclosure utilize machine learning models, such as artificial neural networks, having masking components, such as masked classification layers, that are programmed with identifiers (or indices) of items that may be expected to be depicted within images to be processed by the models. The identifiers of the items may be used to define a set of allowed classes, e.g., a support set, for each inference episode of the models.

The machine learning models of the present disclosure exploit knowledge regarding the items of the support set by redistributing or reassigning output probabilities in a manner consistent with the support set, such as by assigning a zero probability to classes of items that are outside of the support set, and calculating scaled probabilities summing to one for each of the items within the support set.

Figure 1A:
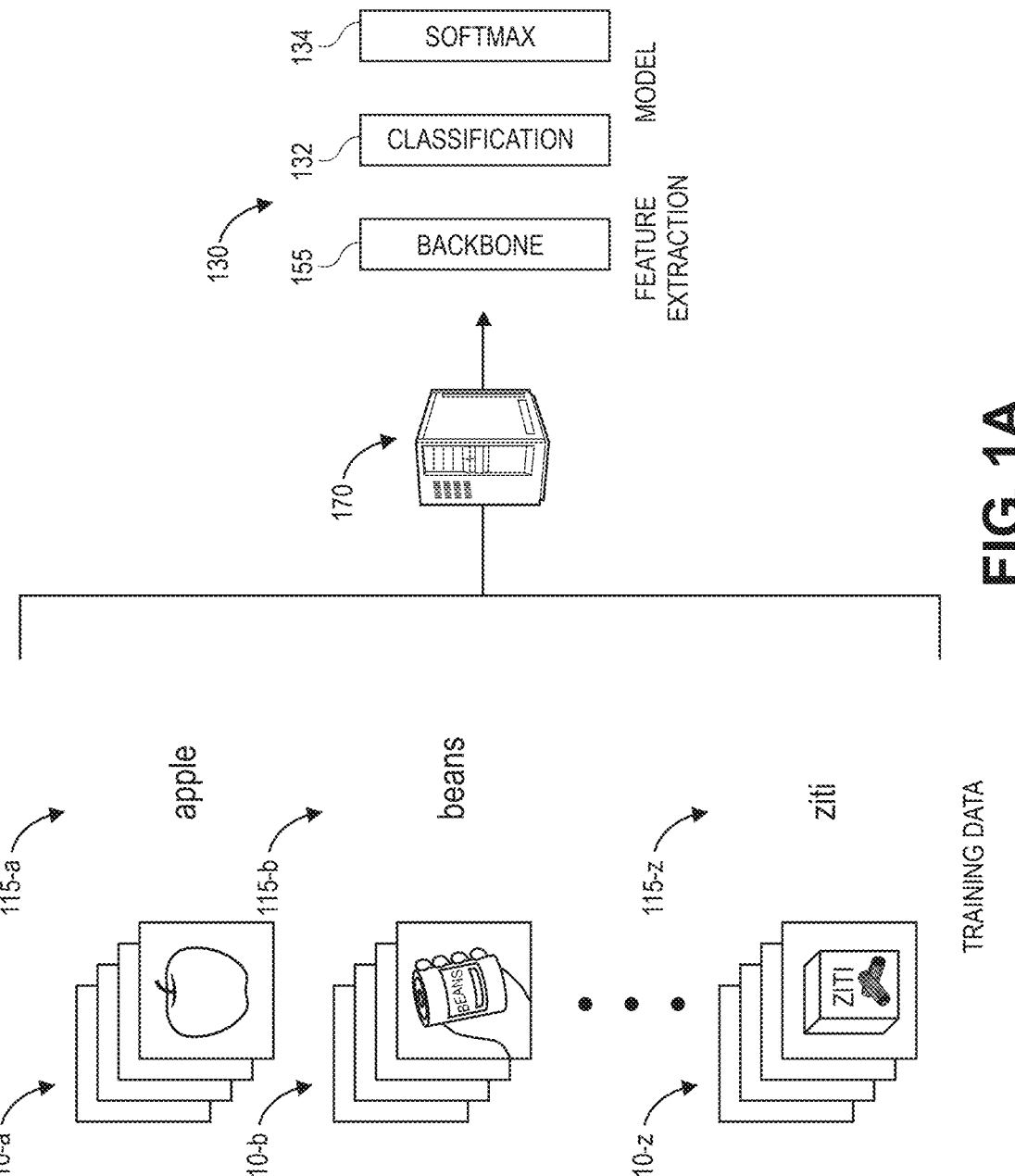

Referring to FIGS. 1A through 1I, views of aspects of one system for image recognition using computer vision in accordance with embodiments of the present disclosure are shown. As is shown in FIG. 1A, a training data set includes a plurality of sets of images 110-$a$, 110-$b$ . . . 110-$z$ depicting objects and a plurality of labels 115-$a$, 115-$b$ . . . 115-$z$ of classes or categories of the objects depicted in the respective sets of images 110-$a$, 110-$b$ . . . 110-$z$.

As is further shown in FIG. 1A, a server 170 having access to the plurality of sets of images 110-$a$, 110-$b$ . . . 110-$z$ and the plurality of labels 115-$a$, 115-$b$ . . . 115-$z$ is configured to operate a model 130 that includes one or more classifying layers 132 and a SoftMax layer 134. The model 130 may be a classifier, or any other type or form of machine learning model that may be trained for use in image recognition applications. In some implementations, the model 130 may be a multi-layer perceptron network or any other multi-layer network having any number of layers of nodes or neurons, e.g., an input layer, an output layer, and any number of hidden layers between the input layer and the output layer. For example, the nodes or neurons of a multi-layer network may be fully connected, such that each of the layers is connected to every neuron in a subsequent layer, or partially connected. The model 130 may be further configured to receive feature vectors (e.g., embeddings) that are generated by a backbone 155 or another feature extraction model. The backbone 155 may be any algorithm, system or technique that is programmed or configured to extract features from images (e.g., characteristics of the images, or properties or other attributes of the images) that are received from a camera in real time or near-real time, or otherwise identified, or to dimensionally reduce the images to a combination representing such characteristics, properties or attributes, e.g., an embedding representation. The backbone 155 may execute any algorithms or techniques for extracting features, such as an artificial neural network, an autoencoder, or others. In some implementations, the backbone 155 may be a component that is separate from the model 130. Alternatively, in some other implementations, the backbone 155 may be a component that is an integral part of the model 130.

Figure 1B:
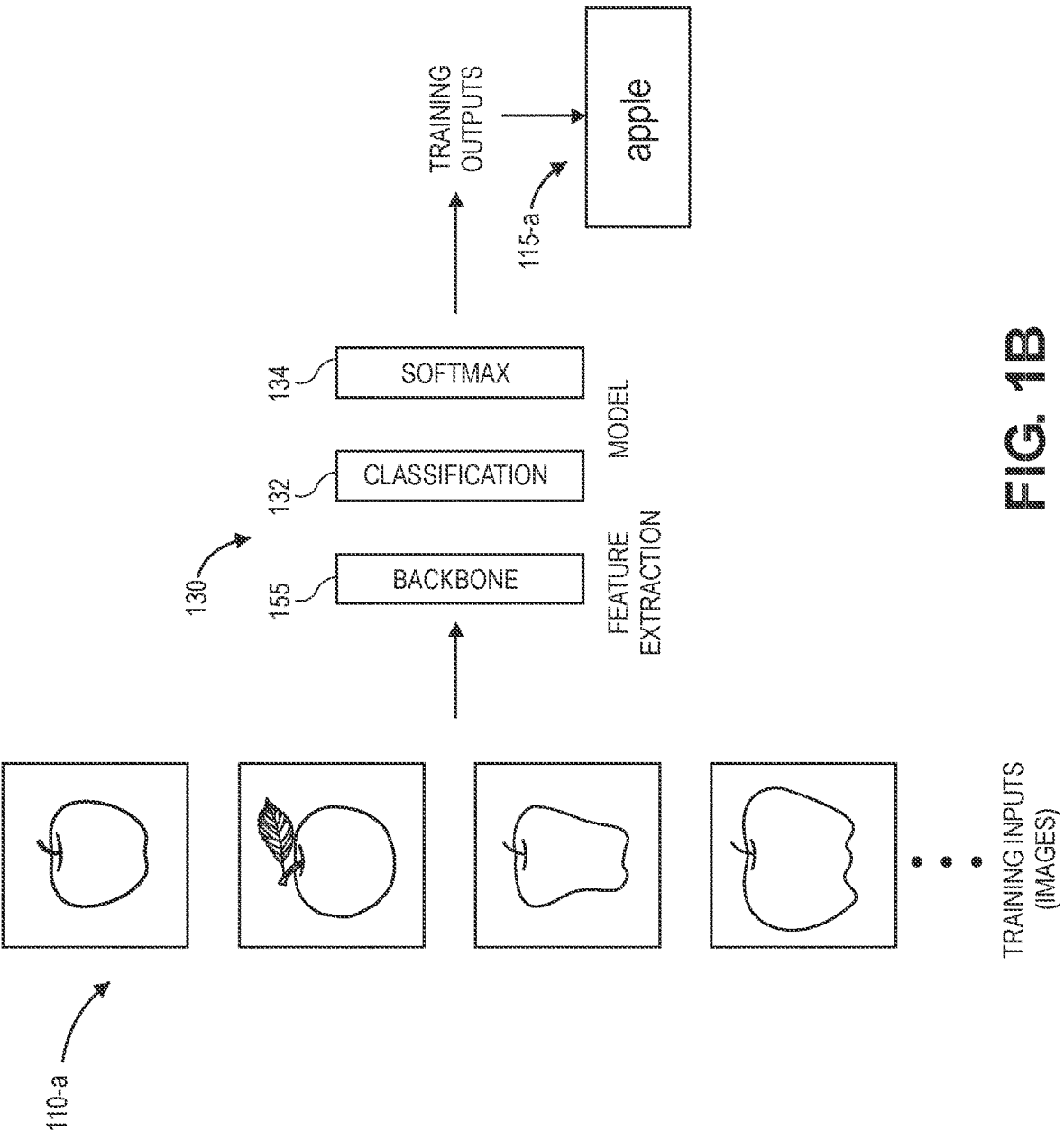

The model 130 may learn and adjust weights and biases of connections between nodes of adjacent layers to minimize differences between predicted outputs and actual outputs during a training process. As is shown in FIG. 1B, the model 130 is trained using a set of images 110-$a$ and a label 115-$a$, viz., "apple," corresponding to the images of the set of images 110-$a$, which depict various types or varieties of apples in any colors or sizes. In some implementations, the set of images 110-$a$ may be preprocessed prior to training, such as by resizing the images of the set, normalizing pixel values of the set, or augmenting the set to include images that are inverted, repositioned, or otherwise modified to enhance the variability of the images. The model 130 is trained by feeding the set of images 110-$a$ to the backbone 155, and providing feature vectors generated by the backbone 155 and the label 115-$a$ to the model 130. Weights of the connections between neurons of adjacent layers may be adjusted to minimize losses based on the set of images 110-$a$ and the label 115-$a$.

In some implementations, portions (or subsets) of the training data set may be set aside to validate the model 130, e.g., to adjust hyperparameters or avoid overfitting, during training, or to test the model 130 after training has been completed. The model 130 may have any type or form of architecture, such as a convolutional neural network architecture. The model 130 may be trained using any loss function, and according to any optimization technique, subject to any metrics or other parameters by which the suitability of the model 130 may be determined.

The set of images 110-*a* may include any number of images depicting objects corresponding to the label 115-*a*. Additionally, although FIG. 1B shows training the model 130 based on the set of images 110-*a* and the label 115-*a*, the model 130 may be trained using any number of the sets of images 110-*a*, 110-*b* . . . 110-*z* and the labels 115-*a*, 115-*b* . . . 115-*z* corresponding to each of such sets.

Figure 1C:
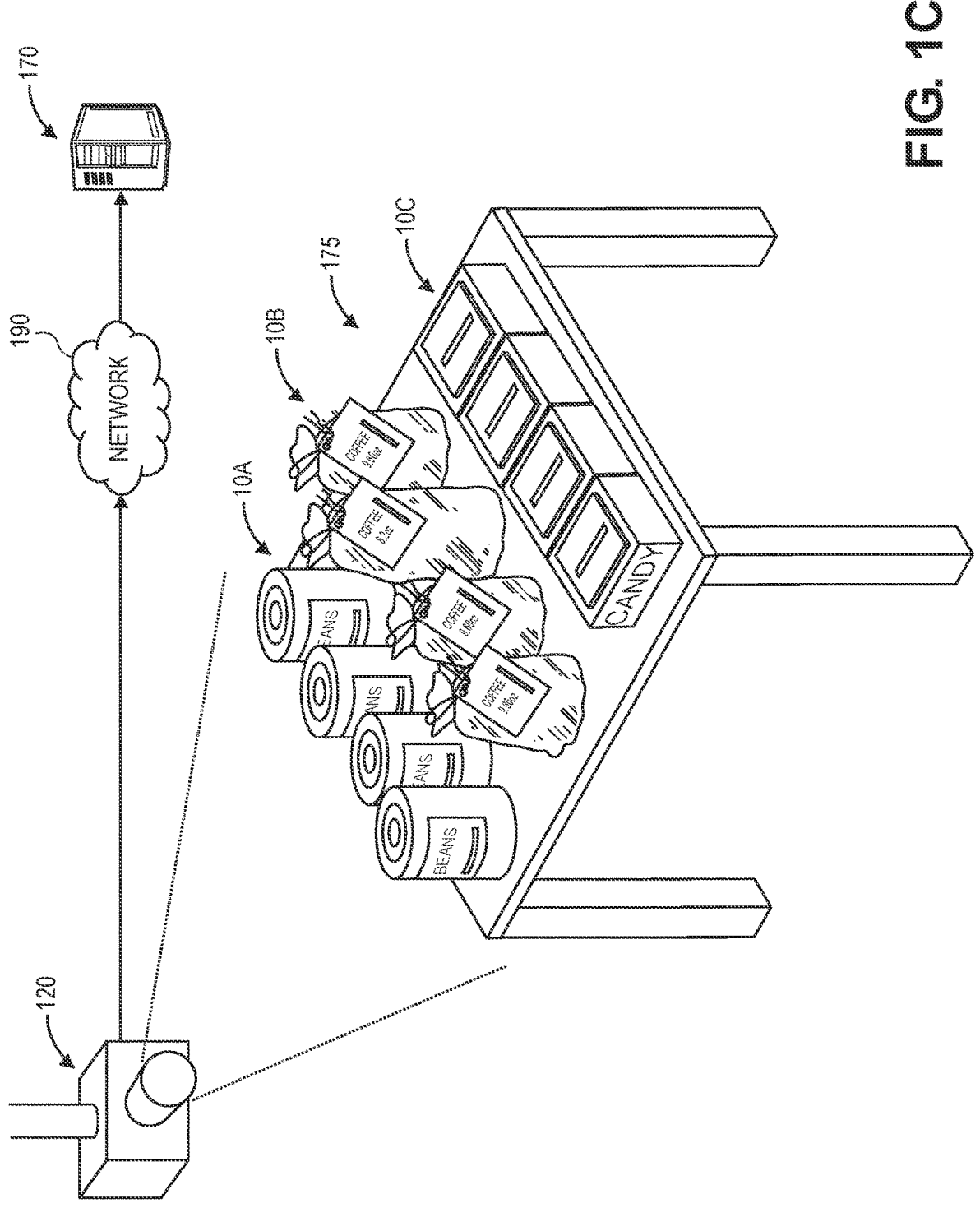

Once the model 130 has been trained to detect objects, the model 130 may be utilized in connection with machine learning models for image recognition that include masking components (or masking classification layers). As is shown in FIG. 1C, a camera 120 including a storage area 175 within a field of view is in communication with the server 170 over one or more networks 190, which may include the Internet in whole or in part. The camera 120 may be configured to capture visual images or any other type or form of imaging data. The storage unit 175 includes a plurality of types of items thereon, including cans of beans 10A, bags of coffee 10B and boxes of candy 10C Alternatively, or additionally, the storage unit 175 may include any number of other items in lieu of or in addition to the beans 10A, the coffee 10B or the candy 10C.

In accordance with implementations of the present disclosure, a machine learning model may include a masking component that may be programmed with a support set of items, e.g., identifiers of items that are likely to be present within images that are captured by a camera and processed by the machine learning model. Subsequently, when a classifier generates activations corresponding to items that are not within the support set, the masking component may significantly decrease the values of such activations, e.g., to significantly negative values such as negative infinity. The masking component then provides the values of activations corresponding to items that are within the support set in their unmodified states, along with the significantly negative values of the activations corresponding to items that are not within the support set, as inputs to a SoftMax layer, or otherwise derives a probability distribution from the modified and unmodified activations.

Figure 1D:
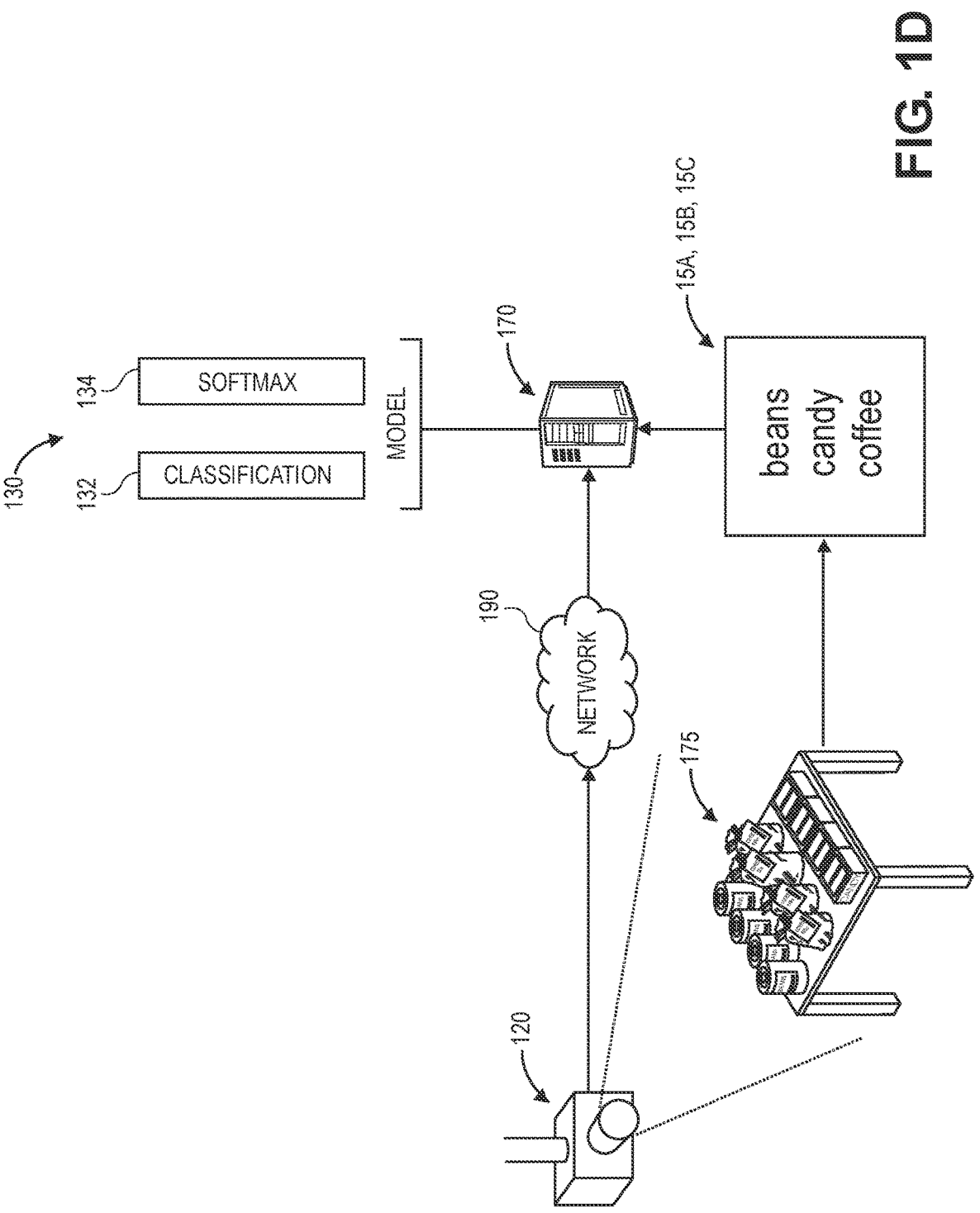
Figure 1E:
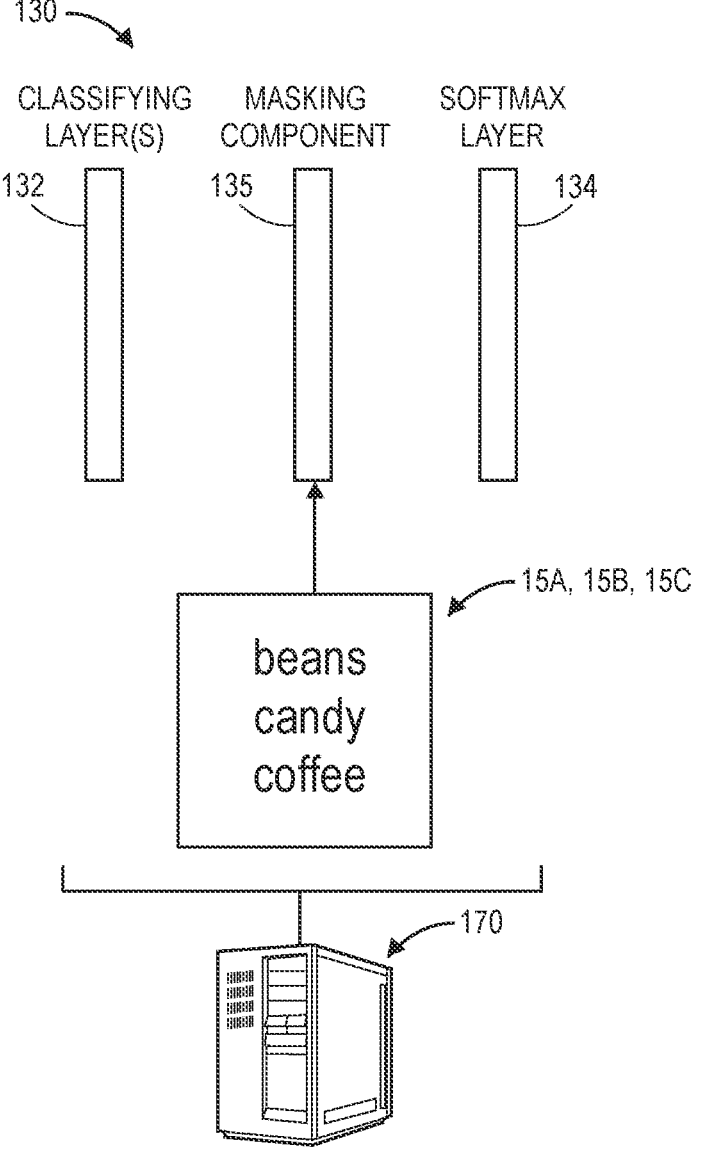

As is shown in FIGS. 1D and 1E, identifiers 15A, 15B, 15C of the items 10A, 10B, 10C provided on the storage unit 175 and within the field of view of the camera 120 are provided to the server 170, and used to program a masking component 135 to be applied between the classifying layers 132 and the SoftMax layer 134 of the model 130. The server 170 may be programmed to receive information or data regarding images captured by the camera 120, or any other cameras (not shown), and to execute the model 130 on inputs including the images or feature vectors generated based on the images, e.g., from the backbone 155 of FIGS. 1A and 1B or any other feature extractor module, in an effort to classify contents of such images, and determine whether such images depict any of the items 10A, 10B, 10C. The identifiers 15A, 15B, 15C of the items 10A, 10B, 10C may be selected on any basis, such as a location of the camera 120 or the storage unit 175, a time of day or a day of a year, or any information or data regarding known inventory levels on the storage unit 175 or other storage units (not shown) within a vicinity of the camera 120, or any items that might be expected to appear within images captured using the camera 120.

Figure 1F:
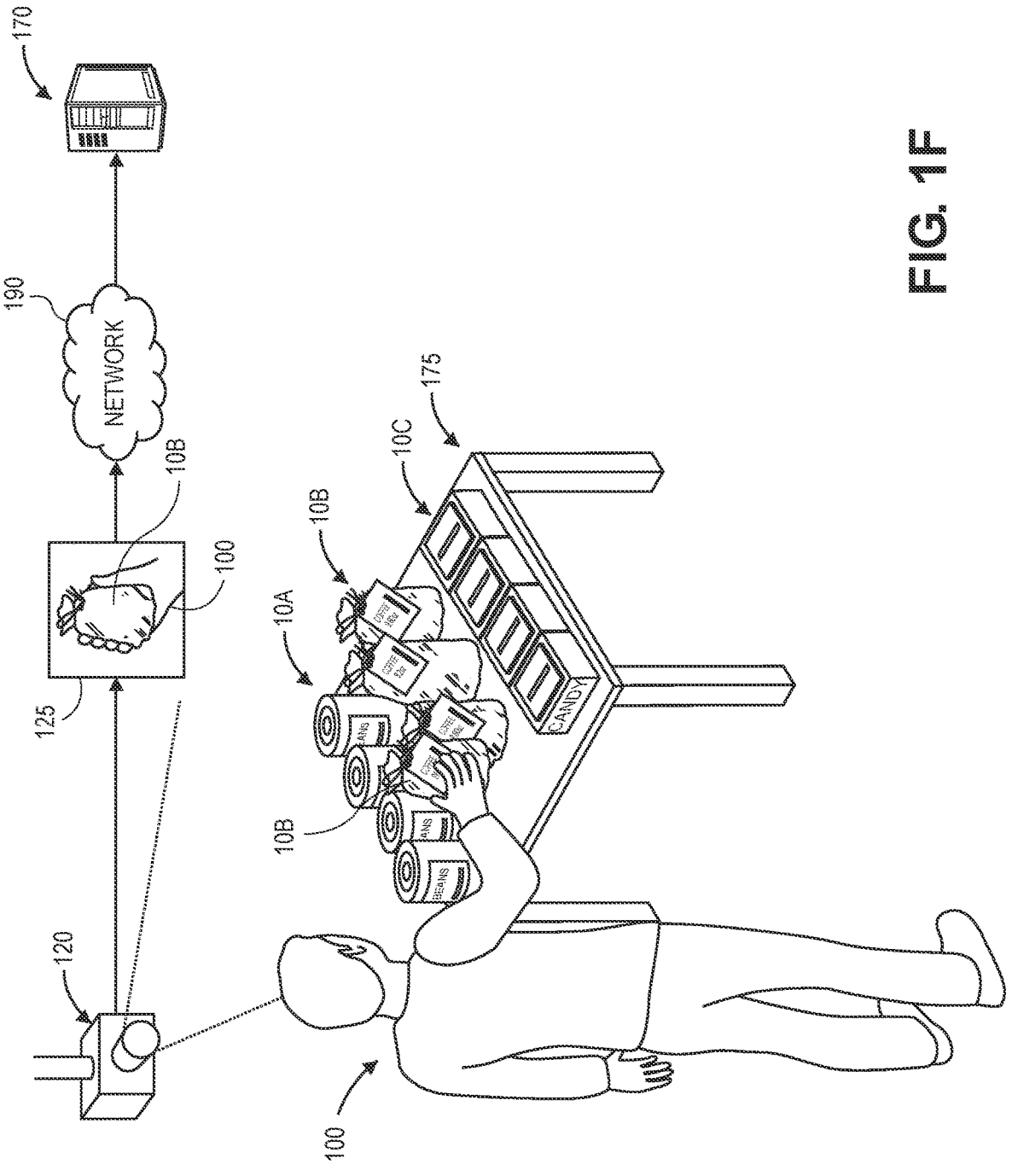
Figure 1G:
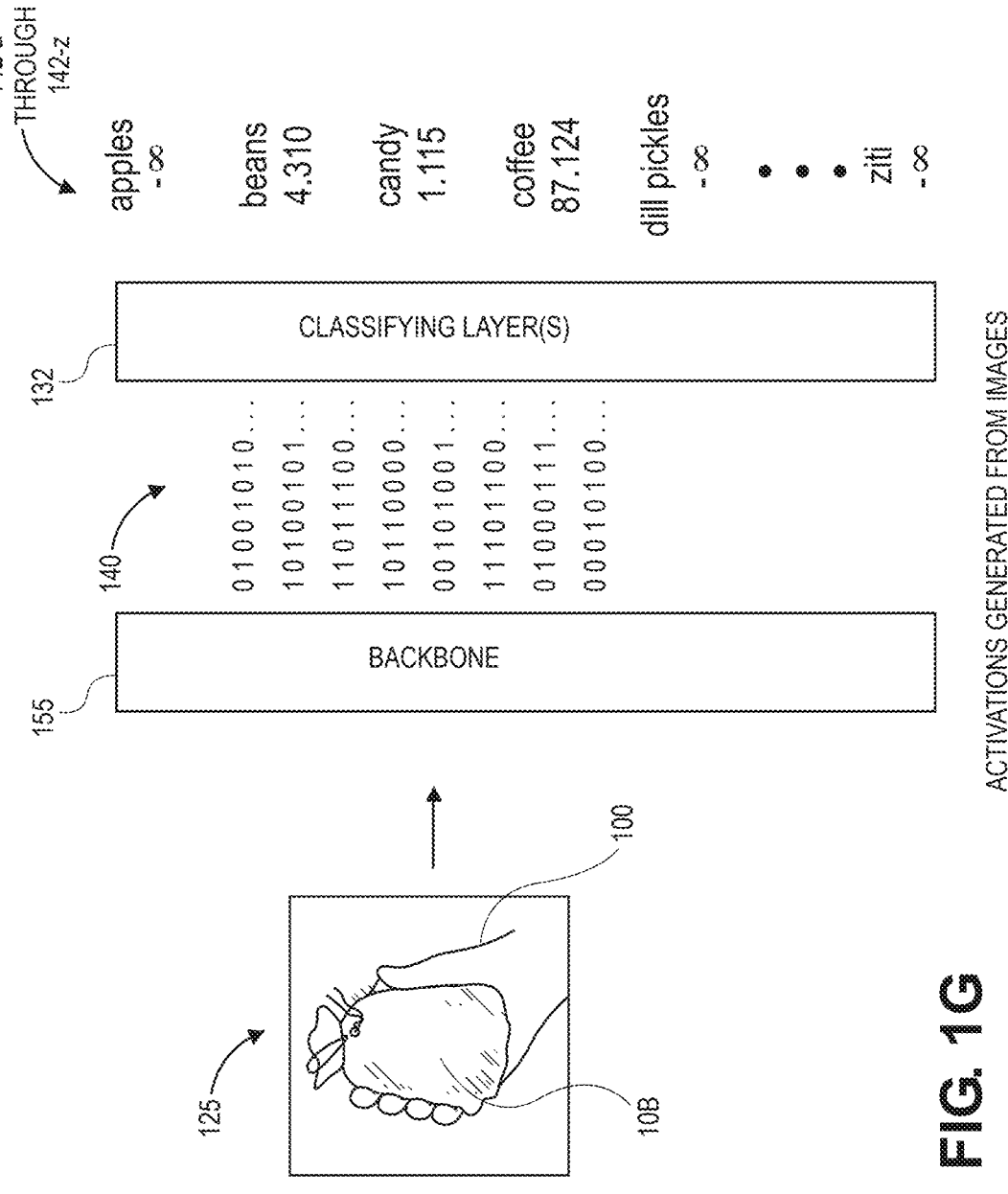

For example, as is shown in FIG. 1F, when a customer 100 (or another person) executes one or more gesture or actions with the storage unit 175, such as to retrieve an item, e.g., the item 10B, from the storage unit 175, the camera 120 captures one or more images 125 and transmits the images 125 to the server 170 over the one or more networks 190. As is shown in FIG. 1G, the images 125 may be provided as inputs to the backbone 155, which may generate a set of feature vectors 140 (e.g., characteristics of the images, or properties or other attributes of the images) or combinations (e.g., embeddings) representing such characteristics, properties or attributes. The backbone 155 provides the feature vectors 140 as inputs to the one or more classifying layers 132 of the model 130. The classifying layers 132 then generate a set of activations 142-*a* through 142-*z* indicating values representing outputs of activation functions generated in response to the inputs.

Figure 1H:
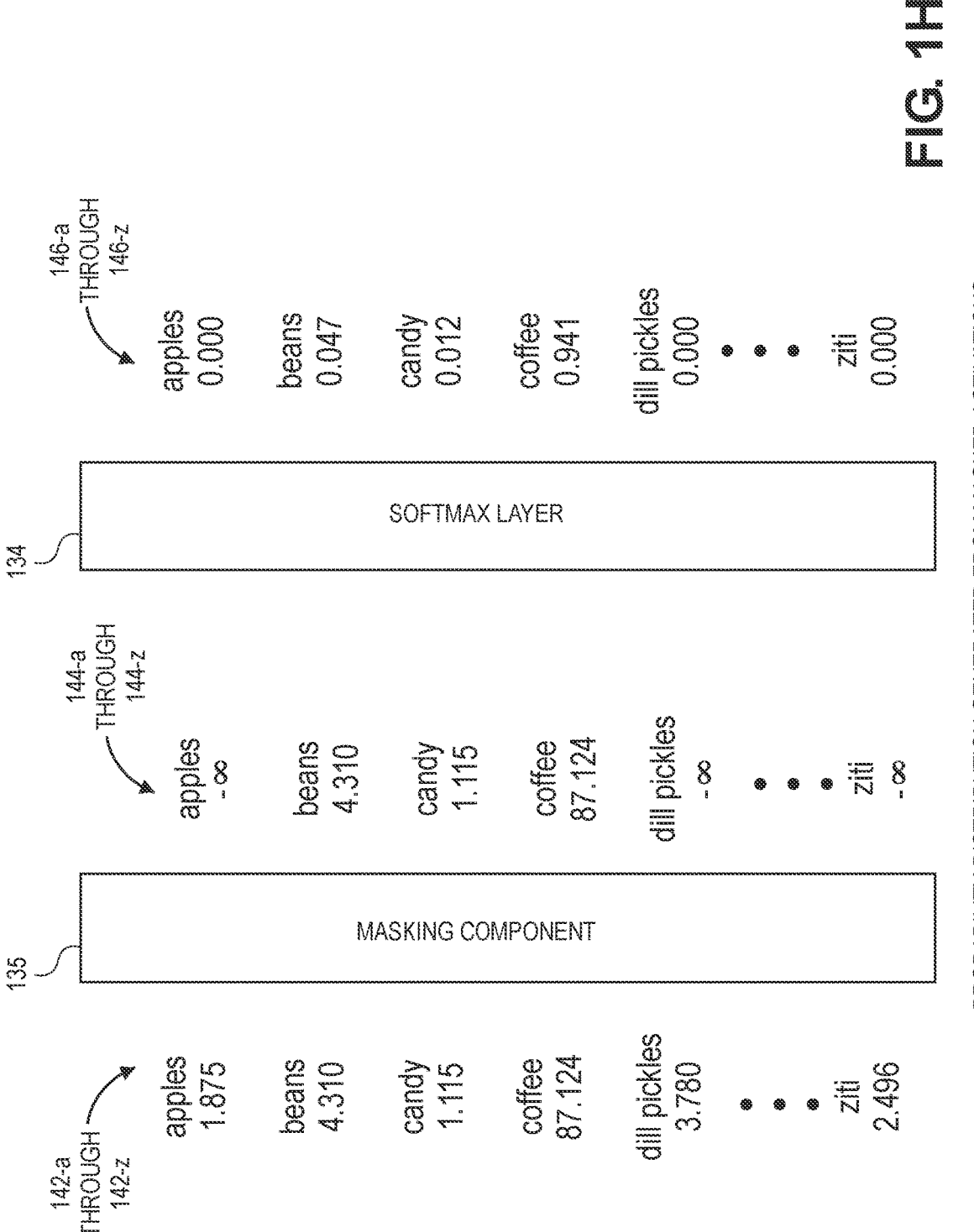
Figure 11:
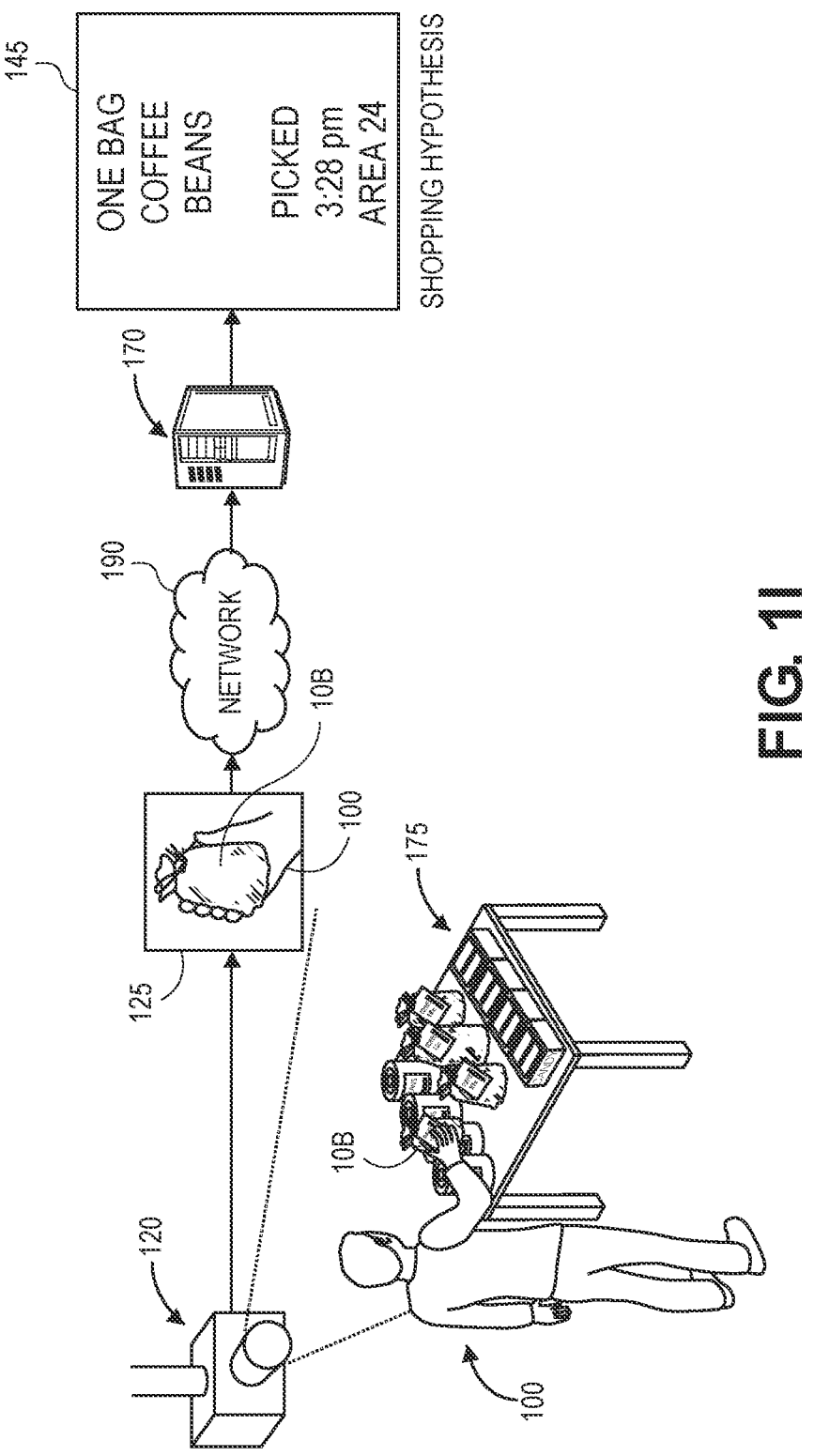

As is shown in FIG. 1H, the activations 142-*a* through 142-*z* are provided to the masking component 135, which has been programmed with classes of items in a support set (e.g., the labels 15A, 15B, 15C of the items 10A, 10B, 10C on the storage unit 175, as is shown in FIG. 1E). The masking component 135 thus dramatically decreases values of activations corresponding to items that are not within the support set, e.g., items other than the items 10A, 10B, 10C, to significantly negative values such as negative infinity, while leaving values of activations corresponding to items that are within the support set unchanged. As is shown in FIG. 1H, the masking component 135 then generates a modified set of activations 144-*a* through 144-*z*, including values of activations corresponding to items that are within the support set in their unmodified states, along with the significantly negative values of the activations corresponding to items that are not within the support set. For example, as is shown in FIG. 1H, the modified set of activations 144-*a* through 144-*z* includes values of the activations 142-*a* through 142-*z* corresponding to the beans 10A, the coffee 10B and the candy 10C, as well values of negative infinity for activations corresponding to items other than the beans 10A, the coffee 10B and the candy 10C.

As is also shown in FIG. 1H, the modified set of activations 144-*a* through 144-*z* generated by the masking component 135 are provided to the SoftMax layer 134, which generates a set of probabilities 146-*a* through 146-*z* from the modified set of activations 144-*a* through 144-*z*. The set of probabilities 146-*a* through 146-*z* includes scaled probabilities for each of the items 10A, 10B, 10C within the support set, e.g., probabilities summing to one, and probabilities of zero for items that are not within the support set.

As is shown in FIG. 1I, the server 170 generates a shopping hypothesis 145 based at least in part on the set of probabilities 146-*a* through 146-*z* shown in FIG. 1H, which were derived from the images 125 received from the camera 120 over the one or more networks 190. For example, the server 170 determines that the customer 100 retrieved the item 10B, viz., coffee, at a time associated with the images 125, and from a portion of the storage unit 175 corresponding to the items 10B. The shopping hypothesis 145 may be determined based on the images 125 alone, or in conjunction with any other systems or methods. For example, in some implementations, the identification of the item 10B based on the set of probabilities 146-*a* through 146-*z* and the association of the item 10B with the customer 100 based on the images 125 may be utilized as a primary technique or means, or as an exclusive technique or means, for detecting events, or associating events with actors based on imaging data. Alternatively, in some implementations, the identification of the item 10B based on the set of probabilities 146-*a* through 146-*z* and the association of the item 10B with the customer 100 based on the images 125 may be utilized as a secondary technique or means, or as an alternate or backup technique or means, for detecting events, or associating events with actors. For example, those of ordinary skill in the pertinent arts will recognize that any of the systems and methods disclosed herein may be utilized in connection with, or in support of, any other technique or means for detecting events, or associating events with actors.

Accordingly, the systems and methods of the present disclosure are directed to detecting items within images, e.g., image recognition, using machine learning models having masked classification layers, or masking components. More specifically, some implementations of the present disclosure are directed to capturing streams of images of a materials handling facility by one or more cameras, and processing the images to detect features depicted therein. Features of the images may be provided to a classifier, or one or more classifying layers, and activations generated by the classifier or classifying layers in response to such features are provided to a masking component that has been programmed with identifiers of items within a support set. The masking component then converts activations generated for items that are not within the support set to negative numbers that are large in value, such as negative infinity, while leaving activations generated for items that are within the support set unchanged. The activations for items that are both within the support set, and not within the support set, are provided as inputs to a SoftMax layer, or a layer configured to execute a SoftMax function, or a smooth approximation of an arguments of the maxima (or "arg max") function, or are otherwise processed to generate a probability distribution that includes probabilities of zero for items that are not within the support set and scaled probabilities for items that are within the support set.

Each of the cameras of the present disclosure may operate one or more machine learning models or other techniques to detect and locate such body parts or other objects within images, or to determine a likelihood or probability that an event occurred at a specific time, or within a specific window of time, and at a specific location within an image. The cameras may also be configured to detect hands or other body parts of actors within an image, to generate regressions or other associations of locations of body parts with one another. The cameras may further filter images that were captured at times or within periods of time when one or more events are predicted to have occurred from images that were captured at other times, or otherwise consider only images that were captured at the times or within the periods of time when the one or more events are predicted to have occurred.

Each of the cameras may also provide records of interactions detected thereby to a central server or other computer system, which may be programmed or configured to determine positions of actors or body parts in 3D space based on such records, e.g., by clustering positions determined by the cameras at common times, or by otherwise triangulating such positions. In some implementations, where records of a predicted interaction are received from multiple cameras, a subset of the cameras (e.g., two of the cameras) having optimal views or perspectives of a predicted position of the interaction may be selected, and positions of one or more body parts of an actor in 3D space may be determined from the records received from the cameras of the subset.

Moreover, portions of images that are determined to depict hands may be identified and processed to determine whether the hands depicted therein contain any items (e.g., whether the hands are empty or full), or to identify any items within the hands. When a hand is determined to contain an item, a location of the item within an image or a position of the item in 3D space may be determined and tracked based on a location or position of the hand. When the hand is identified as empty, the location or the position of the hand may no longer serve as a substitute for the location or the position of the item.

In some implementations, one or more processors or processor units provided on cameras or other computer devices or systems may operate or execute machine learning models that are trained to receive images captured by the cameras as inputs and to generate one or more outputs associated with tasks relating to the images. Such tasks may include the detection of body parts (e.g., hands, heads, shoulders or others) within images, the identification of portions of images depicting such body parts or the analysis of such portions to determine whether any of such body parts includes an item, or the calculation of distances between body parts and locations of items. The machine learning models may have any number of layers associated with the performance of such tasks, or others.

In some implementations, cameras or other computer devices or systems may be configured to operate machine learning models that are trained to perform multiple tasks based on a single input. For example, in some implementations, a camera may execute a machine learning model (e.g., a deep network) that performs body part detection, cropping or isolation, object recognition, or other tasks based on each visual images captured thereby. The machine learning model may be constructed with a common, shared backbone and with one or more separate decoding layers, task layers, middle layers, or others. In some implementations, the machine learning model may be a convolutional neural network having one or more layers dedicated to the performance of each of a plurality of tasks, e.g., in a common architecture.

Those of ordinary skill in the pertinent arts will recognize that imaging data, e.g., visual imaging data, depth imaging data, infrared imaging data, or imaging data of any other type or form, may be captured using one or more imaging devices such as digital cameras, depth sensors, range cameras, infrared cameras or radiographic cameras. Such devices generally operate by capturing light that is scattered or reflected from objects, and by subsequently calculating or assigning one or more quantitative values to aspects of the scattered or reflected light, e.g., image pixels, then generating an output based on such values, and storing such values in one or more data stores. For example, a camera may include one or more image sensors (e.g., a photosensitive surface with a plurality of pixel sensors provided thereon) having one or more filters associated therewith. Such sensors may detect information regarding aspects of any number of image pixels of the scattered or reflected light corresponding to one or more base colors (e.g., red, green or blue), or distances to objects from which the light was scattered or reflected. Such sensors may then generate data files including such information, and store such data files in one or more onboard or accessible data stores (e.g., a hard drive or other like component), or in one or more removable data stores (e.g., flash memory devices). Such data files may also be printed, displayed on one or more broadcast or closed-circuit television networks, or transmitted over a computer network as the Internet.

An imaging device that is configured to capture and store visual imaging data (e.g., color images) is commonly called an RGB ("red-green-blue") imaging device (or camera), while an imaging device that is configured to capture both visual imaging data and depth imaging data (e.g., ranges) is commonly referred to as an RGBD or RGBz imaging device (or camera). Imaging data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Scattered or reflected light may be captured or detected by an imaging device if the light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is scattered or reflected off objects of any kind to a sufficiently high degree of resolution using one or more sensors thereof, and store information regarding the scattered or reflected light in one or more data files.

Many imaging devices also include manual or automatic features for modifying their respective fields of view or orientations. For example, a camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some imaging devices may digitally or electronically adjust an image identified in a field of view, subject to one or more physical or operational constraints. For example, a camera may virtually stretch or condense the pixels of an image in order to focus or broaden the field of view of the camera, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures, outlines or other aspects of the features or objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color National Flag Blue may be expressed as #3C3B6E. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine learning nideks. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts. For example, objects or portions thereof expressed within imaging data may be associated with a label or labels according to one or more machine-learning classifiers, algorithms or techniques, including but not limited to nearest neighbor methods or analyses, artificial neural networks, factorization methods or techniques, K-means clustering analyses or techniques, similarity measures such as log likelihood similarities or cosine similarities, latent Dirichlet allocations or other topic models, or latent semantic analyses.

Machine learning models, such as artificial neural networks, have also been utilized to identify relations between respective elements of apparently unrelated sets of data. An artificial neural network is a parallel distributed computing processor system comprised of individual units that may collectively learn and store experimental knowledge, and make such knowledge available for use in one or more applications. Such a network may simulate the non-linear mental performance of the many neurons of the human brain in multiple layers by acquiring knowledge from an environment through one or more flexible learning processes, determining the strengths of the respective connections between such neurons, and utilizing such strengths when storing acquired knowledge. Like the human brain, an artificial neural network may use any number of neurons in any number of layers, including an input layer, an output layer, and one or more intervening hidden layers. In view of their versatility, and their inherent mimicking of the human brain, machine learning tools including not only artificial neural networks but also nearest neighbor methods or analyses, factorization methods or techniques, K-means clustering analyses or techniques, similarity measures such as log likelihood similarities or cosine similarities, latent Dirichlet allocations or other topic models, or latent semantic analyses have been utilized in image processing applications.

Artificial neural networks may be trained to map input data to desired outputs by adjusting the strengths of the connections between one or more neurons, which are sometimes called synaptic weights. An artificial neural network may have any number of layers, including an input layer, an output layer, and any number of intervening hidden layers. Each of the neurons in a layer within a neural network may receive an input and generate an output in accordance with an activation or energy function, with parameters corresponding to the various strengths or synaptic weights. For example, in a heterogeneous neural network, each of the neurons within the network may be understood to have different activation or energy functions. In some neural networks, at least one of the activation or energy functions may take the form of a sigmoid function, wherein an output thereof may have a range of zero to one or 0 to 1. In other neural networks, at least one of the activation or energy functions may take the form of a hyperbolic tangent function, wherein an output thereof may have a range of negative one to positive one, or −1 to +1. Thus, the training of a neural network according to an identity function results in the redefinition or adjustment of the strengths or weights of such connections between neurons in the various layers of the neural network, in order to provide an output that most closely approximates or associates with the input to the maximum practicable extent.

Artificial neural networks may typically be characterized as either feedforward neural networks or recurrent neural networks, and may be fully or partially connected. In a feedforward neural network, e.g., a convolutional neural network, information may specifically flow in one direction from an input layer to an output layer, while in a recurrent neural network, at least one feedback loop returns information regarding the difference between the actual output and the targeted output for training purposes. Additionally, in a fully connected neural network architecture, each of the neurons in one of the layers is connected to all of the neurons in a subsequent layer. By contrast, in a sparsely connected neural network architecture, the number of activations of each of the neurons is limited, such as by a sparsity parameter.

Moreover, the training of a neural network is typically characterized as supervised or unsupervised. In supervised learning, a training set comprises at least one input and at least one target output for the input. Thus, the neural network is trained to identify the target output, to within an acceptable level of error. In unsupervised learning of an identity function, such as that which is typically performed by a sparse autoencoder, target output of the training set is the input, and the neural network is trained to recognize the input as such. Sparse autoencoders employ backpropagation in order to train the autoencoders to recognize an approximation of an identity function for an input, or to otherwise approximate the input. Such backpropagation algorithms may operate according to methods of steepest descent, conjugate gradient methods, or other like methods or techniques, in accordance with the systems and methods of the present disclosure. Those of ordinary skill in the pertinent art would recognize that any algorithm or method may be used to train one or more layers of a neural network. Likewise, any algorithm or method may be used to determine and minimize errors in an output of such a network. Additionally, those of ordinary skill in the pertinent art would further recognize that the various layers of a neural network may be trained collectively, such as in a sparse autoencoder, or individually, such that each output from one hidden layer of the neural network acts as an input to a subsequent hidden layer.

Once a neural network has been trained to recognize dominant characteristics of an input of a training set, e.g., to associate an image with a label to within an acceptable tolerance, an input in the form of an image may be provided to the trained network, and a label may be identified based on the output thereof.

Figure 2:
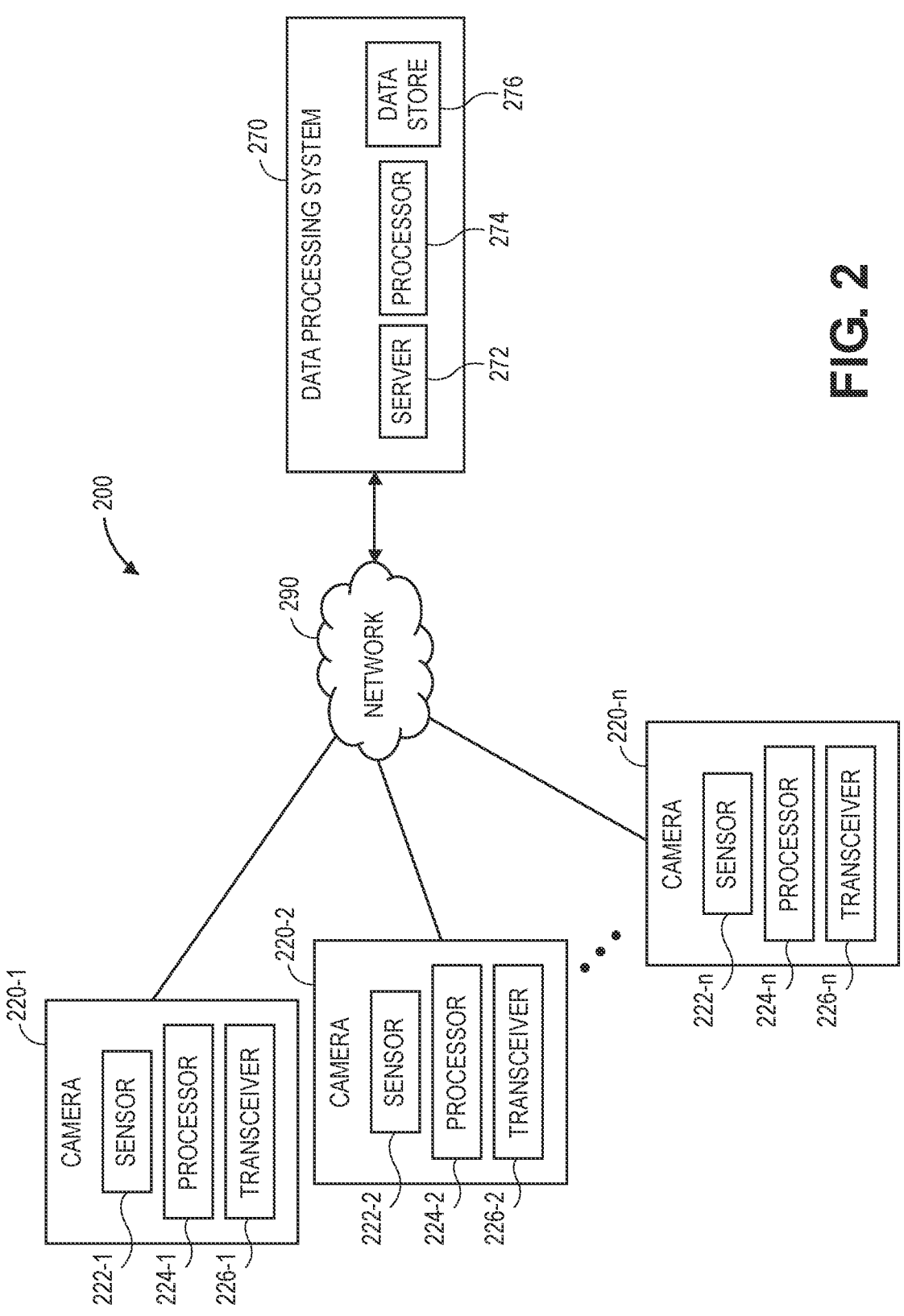
FIG. 2 is a block diagram of one system for image recognition in accordance with embodiments of the present disclosure.

Referring to FIG. 2, a block diagram of one system for image recognition in accordance with embodiments of the present disclosure is shown. Except where otherwise noted, reference numerals preceded by the number "2" shown in FIG. 2 indicates components or features that are similar to components or features having reference numerals preceded by the number "1" shown in FIGS. 1A through 1I.

The system 200 of FIG. 2 includes a plurality of cameras 220-1, 220-2 . . . 220-n and a data processing system 270 that are connected to one another over a network 290, which may include the Internet, in whole or in part. As is shown in FIG. 2, each of the cameras 220-1, 220-2 . . . 220-n has one or more sensors 222-1, 222-2 . . . 222-n as well as one or more processors 224-1, 224-2 . . . 224-n and one or more transceivers 226-1, 226-2 . . . 226-n or other communications systems.

The cameras 220-1, 220-2 . . . 220-n of the present disclosure may be any devices or systems that are configured to capture imaging data, including but not limited to images of actors such as customers, workers or others and their interactions with any number of items in an environment or scene, such as a retail establishment or another materials handling facility. The cameras 220-1, 220-2 . . . 220-n of the present disclosure may include any number of components that are mounted within housings of any size or shape, and may be used to photograph or otherwise record imaging data of structures, facilities, terrain or any other elements appearing within their respective fields of view. The sensors 222-1, 222-2 . . . 222-n may be any sensors, such as color sensors, grayscale sensors, black-and-white sensors, or other visual sensors, as well as depth sensors or any other type of sensors, that are configured to capture visual imaging data (e.g., textures) or depth imaging data (e.g., ranges) to objects within one or more fields of view of the cameras 220-1, 220-2 . . . 220-$n$. In some implementations, the sensors 222-1, 222-2 . . . 222-$n$ may have single elements or a plurality of photoreceptors or photosensitive components (e.g., a CCD sensor, a CMOS sensor, or another sensor), which may be typically arranged in an array. Light reflected from objects within fields of view of the cameras 220-1, 220-2 . . . 220-$n$ may be captured by the sensors 222-1, 222-2 . . . 222-$n$, and quantitative values, e.g., pixels, may be assigned to one or more aspects of the reflected light.

In addition to the one or more sensors 222-1, 222-2 . . . 222-$n$, the one or more processors 224-1, 224-2 . . . 224-$n$ and the one or more transceivers 226-1, 226-2 . . . 226-$n$, the cameras 220-1, 220-2 . . . 220-$n$ may also include any number of other components that may be required in order to capture, analyze and/or store imaging data, including but not limited to one or more lenses, memory or storage components, photosensitive surfaces, filters, chips, electrodes, clocks, boards, timers, power sources, connectors or any other relevant features (not shown).

The cameras 220-1, 220-2 . . . 220-$n$ may capture imaging data in the form of one or more still or moving images (e.g., streams of visual and/or depth image frames), along with any relevant audio signals or other information (e.g., position data). The cameras 220-1, 220-2 . . . 220-$n$ may also include one or more illuminators (not shown), such as laser systems or light-emitting diodes (or "LED") for illuminating portions of environments or scenes appearing within the fields of view of the cameras 220-1, 220-2 . . . 220-$n$, as necessary.

The processors 224-1, 224-2 . . . 224-$n$ may be configured to process imaging data captured by one or more of the sensors 222-1, 222-2 . . . 222-$n$. For example, in some implementations, the processors 224-1, 224-2 . . . 224-$n$ may be configured to execute any type or form of machine learning models or techniques, e.g., an artificial neural network.

The transceivers 226-1, 226-2 . . . 226-$n$ enable the cameras 220-1, 220-2 . . . 220-$n$ to communicate with the data processing system 270 or any other external devices, systems or components by way of the network 290. In some implementations, the cameras 220-1, 220-2 . . . 220-$n$ may be configured to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, either by way of the servers 272 or over the network 290 directly.

The cameras 220-1, 220-2 . . . 220-$n$ of FIG. 2 may be deployed in any number, and may be homogenous or heterogeneous in nature, in accordance with the present disclosure. For example, the sensors 222-1, 222-2 . . . 222-$n$ of one or more of the cameras 220-1, 220-2 . . . 220-$n$ may include both visual (e.g., color, grayscale or black-and-white) and depth sensors. Alternatively, one or more of the sensors 222-1, 222-2 . . . 222-$n$ may include just a visual sensor, or just a depth sensor. For example, one or more of the cameras 220-1, 220-2 . . . 220-$n$ may include an RGB color camera, a still camera, a motion capture/video camera or any other type or form of camera. In other implementations, one or more of the cameras 220-1, 220-2 . . . 220-$n$ may include depth-sensing cameras, such as an RGBD or RGBz camera. In still other implementations, one or more of the cameras 220-1, 220-2 . . . 220-$n$ may include a thermographic or infrared (or "IR") camera. Additionally, in some implementations, one or more of the cameras 220-1, 220-2 . . . 220-$n$ may simply be camera modules that include a lens and an image sensor configured to convert an optical image obtained using the lens of the camera into a digital signal or digital representation of the image (generally referred to herein as imaging data).

The cameras 220-1, 220-2 . . . 220-$n$ may also include manual or automatic features for modifying their respective fields of view or orientations. For example, one or more of the cameras 220-1, 220-2 . . . 220-$n$ may include one or more motorized features for adjusting positions of the cameras 220-1, 220-2 . . . 220-$n$, or for adjusting either a focal length or an angular orientation of the cameras 220-1, 220-2 . . . 220-$n$, by causing changes in the distance between the sensor and the lens (e.g., optical zoom lenses or digital zoom lenses), or changes in one or more of the angles defining the angular orientation.

Some of the cameras 220-1, 220-2 . . . 220-$n$ may digitally or electronically adjust images captured from fields of view of the respective cameras 220-1, 220-2 . . . 220-$n$ subject to one or more physical and operational constraints. For example, a camera may virtually stretch or condense the pixels of an image in order to focus or broaden a field of view of the camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Additionally, the processors 224-1, 224-2 . . . 224-$n$ or other components of the cameras 220-1, 220-2 . . . 220-$n$ may be configured to recognize characteristics of stationary or moving objects or portions thereof depicted in one or more images, and to match such characteristics against information regarding contours, outlines, colors, textures, silhouettes, shapes or other characteristics of known objects, which may be stored in one or more data stores. In this regard, stationary or moving objects may be classified based at least in part on the extent to which the characteristics identified in one or more images correspond to one or more of the characteristics of the known objects. For example, in some implementations, the processors 224-1, 224-2 . . . 224-$n$ may be programmed to execute one or more machine learning algorithms, tools or techniques.

In some implementations, components of the cameras 220-1, 220-2 . . . 220-$n$ may be self-powered, e.g., by one or more internal or onboard power sources, such as batteries or fuel cells. In some other implementations, however, components of the cameras 220-1, 220-2 . . . 220-$n$ may receive power of any type or form from one or more external power sources, e.g., by one or more conductors or other connectors. Accordingly, the cameras 220-1, 220-2 . . . 220-$n$ may include any number of transformers, converters (e.g., step-down converters), capacitors, resistors, inductors, transistors or other components for utilizing or altering power received from such external power sources. Furthermore, in some implementations, the cameras 220-1, 220-2 . . . 220-$n$ may be configured to receive power via one or more connections or conductors that may also be provided for one or more other purposes, such as according to a PoE standard or system that may also be utilized to receive information or data from one or more external devices or systems, or to transfer information or data to one or more external devices or systems, e.g., over the network 290.

Although the system 200 of FIG. 2 includes boxes corresponding to three cameras 220-1, 220-2 . . . 220-$n$, those of ordinary skill in the pertinent arts will recognize that any number or type of dual camera module systems may be operated in accordance with the present disclosure. For example, in some implementations, the system 200 may include dozens or even hundreds of cameras 220-1, 220-2 . . . 220-*n* of any type or form, which may be mounted in regular or irregular configurations over or in association with a materials handling facility or other environment or scene in any manner.

The data processing system 270 includes one or more physical computer servers 272 having one or more computer processors 274 and any number of data stores 276 (e.g., databases) associated therewith, as well as provided for any specific or general purpose. For example, the data processing system 270 of FIG. 2 may be independently provided for the exclusive purpose of receiving, analyzing or storing imaging data or other information or data received from the cameras 220-1, 220-2 . . . 220-*n* or, alternatively, provided in connection with one or more physical or virtual services that are configured to receive, analyze or store such imaging data or other information or data, as well as to perform one or more other functions. In some implementations, the data processing system 270 may be associated with a materials handling facility, or any other physical or virtual facility.

The servers 272 may be connected to or otherwise communicate with the processors 274 and the data stores 276, which may store any type of information or data, including but not limited to acoustic signals, information or data relating to imaging data, or information or data regarding environmental conditions, operational characteristics, or positions, for any purpose. The servers 272, the processors 274 and/or the data stores 276 may also connect to or otherwise communicate with the network 290, through the sending and receiving of data. For example, the data processing system 270 may include any facilities, stations or locations having the ability or capacity to receive and store information or data, such as media files, in one or more data stores, e.g., media files received from the cameras 220-1, 220-2 . . . 220-*n*, or from one or more other external computer systems (not shown) via the network 290. In some implementations, the data processing system 270 may be provided in a physical location. In other such implementations, the data processing system 270 may be provided in one or more alternate or virtual locations, e.g., in a "cloud"-based environment. In still other implementations, the data processing system 270 may be provided onboard one or more vehicles, which may operate in the air, on land or sea.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some implementations, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The cameras 220-1, 220-2 . . . 220-*n* and/or the data processing system 270 may use any web-enabled or Internet applications or features, or any other client-server applications or features including E-mail or other messaging techniques, to connect to the network 290, or to communicate with one another. For example, the cameras 220-1, 220-2 . . . 220-*n* may be adapted to transmit information or data in the form of synchronous or asynchronous messages to the data processing system 270 or to any other computer device in real time or in near-real time, or in one or more offline processes, via the network 290. Those of ordinary skill in the pertinent art would recognize that the cameras 220-1, 220-2 . . . 220-*n* or the data processing system 270 may operate or be operated by any of a number of computing devices that are capable of communicating over the network, including but not limited to set-top boxes, smart speakers, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processors 224-1, 224-2 . . . 224-*n* or the processor 274, or any other computers or control systems utilized by the cameras 220-1, 220-2 . . . 220-*n* or the data processing system 270, and having sequences of instructions which, when executed by a processor (e.g., a central processing unit, or "CPU"), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions.

Further, implementations may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose.

Referring to FIG. 3, a flow chart 300 of one process for image recognition in accordance with embodiments of the present disclosure is shown.

At box 310, a training data set for training a machine learning model including a masking component of the present disclosure is defined. The training data set includes images depicting objects and labels of the objects is defined. In some implementations, the objects depicted within the images may be of any kind. For example, one or more of the objects may be a commercial item that is available at a materials handling facility. In some other implementations, however, the objects may be limited to those of a particular class, category or use. For example, where the machine learning model is to be trained to recognize items in a commercial setting, the training data set may include images of such items that are labeled with identifiers of the items. Where the machine learning model is to be used in a setting other than a commercial setting, the training data set may include images of objects that one may expect to encounter within the other setting, and such images may be labeled with identifiers of such objects. The labels of the objects depicted within the images may be obtained in any manner.

At box 315, the images of the training data set are processed to generate sets of feature vectors for each of the images. For example, the images may be provided to one or more machine learning models, e.g., convolutional neural networks, transformers, or others, that are trained to generate vectors of features representative of the respective images. Such features may include, but need not be limited to, abstractions of the images that characterize or numerically quantify the contents of the images, e.g., individual pixels or sets of pixels, and may be real, integer, or binary-valued.

The images may be pre-processed as necessary prior to providing the images to the machine learning models, such as by resizing or normalizing the images, or augmenting the images as necessary.

At box 320, a machine learning model is trained to recognize objects based on the feature vectors and the labels. For example, a classifier, such as a multilayer perceptron network or any other multi-layer network, may be selected for use as a machine learning model, and weights or other coefficients and bias terms of the machine learning model may be initialized. The machine learning model may be trained using a loss function, such as a cross-entropy loss function, that may be defined to measure differences between predictions and labels, as well as an optimization algorithm that adjusts the weights and bias to minimize the loss function. The training of the machine learning model may occur over any number of iterations of epochs, using all of the images and their respective labels, or a subset of the images and labels. Moreover, a validation data set of images and labels may be set aside or extracted from the training data set of images and labels, and used to periodically test or evaluate the machine learning model.

At box 325, a camera captures a set of images. The camera may be provided in any environment or scene, such as a retail establishment or another materials handling facility, and aligned to capture imaging data depicting events at the environment or scene. The camera may be mounted or aligned to include a plurality of items, or a plurality of locations that may be associated with items, within a field of view. For example, the camera may be mounted above an environment or a scene in any manner, such as by mounting the camera to one or more ceilings, false ceilings (e.g., to poles, frames, panels or joints), trusses, beams, or other systems, e.g., by threaded tie rods or other components descending from such systems, or in any other manner. Alternatively, in some implementations, the camera may be mounted to an underside of a structure, such as a shelf, an arch or a bridge, or to an elevated system such as a pole or stanchion. In still other implementations, the camera may be mounted to a wall or other vertical surface in an alignment such that axes of orientation of the camera modules extend within horizontal planes, or planes that are aligned at angles other than vertical.

At box 330, the images captured by the camera are processed to generate feature vectors. For example, the images may be provided to one or more machine learning models, e.g., convolutional neural networks, transformers, or others, that are trained to generate vectors of features representative of the respective images. In some implementations, the images may be provided to the same model that was utilized to generate feature vectors for images of the training data set at box 315, or a similar model. Alternatively, in some other implementations, the images may be provided to a different model to generate the feature vectors.

In some implementations, the images may be preprocessed to prepare or otherwise modify the images prior to processing the images to generate feature vectors. For example, where the images are captured at a materials handling facility or another like facility, the images may be cropped about locations depicting one or more hands within the images, or any other points within the images, and the cropped portions of the images may be processed to generate feature vectors therefrom. Alternatively, feature vectors may be generated from an image by processing the image in its entirety.

At box 335, identifiers of items are provided to a masking component of the machine learning model. The items for which identifiers are to be provided may be selected on any basis. In some implementations, where an item is known or anticipated to be within the field of view of the camera, or to be depicted within one or more images, an identifier of the item may be identified and provided to a masking component. For example, where the camera is fixed in its position, and where items that are ordinarily present within the field of view of the camera are known, identifiers of such items may be determined and provided to a masking component.

Identifiers of the items may be determined in any manner. For example, in some implementations, where a camera holds one or more storage units such as shelves, tables, carts, or other fixed or mobile units within a field of view, items that are typically associated with such storage units may be identified from planogram data, and identifiers of the items may be provided to the masking component.

The masking component may be an intrinsic component of the machine learning model, or may be added to the machine learning model after the machine learning model has been trained to recognize the objects at box 320. For example, in some implementations, the masking component may be configured to allow activations to pass therethrough in an unmodified or unadjusted condition during training, such as where the masking component is a matrix or a set of values having weights of one or biases of zero.

At box 340, the masking component of the machine learning model is programmed with a support set including the identifiers of the items. Where items for which activations are to be generated by the machine learning model are arranged in a predetermined order, e.g., alphabetical, serial, or any other order, the masking component may be programmed to identify items that are in the support set, or items that are not in the support set, accordingly.

At box 345, the feature vectors generated at box 330 are provided as inputs to the trained machine learning model, and at box 350, activations generated in response to the inputs are provided to the masking component.

At box 355, the masking component of the machine learning model transforms the activations of the items that are not in the support set to negative infinity. For example, where a feature vector derived from an image of an item generates activations corresponding to items that are not members of the support set, the masking component identifies the activations as such, and sets their respective values to negative infinity, or to another significantly negative number. For example, in some implementations, the masking component may be a matrix or a set of values including different values of weights or biases to be applied to activations of items that are within the support set, and weights or biases to be applied to activations of items that are not within the support set. In such implementations, the weights to be applied to activations of items in the support set may be set to one, or biases to be applied to activations of items in the support set may be set to zero. Likewise, in such implementations, the weights to be applied to activations of items in the support set may be programmed to significantly negative values that, when applied to such activations, cause the activations to likewise have significantly negative values. Alternatively, or additionally, in such implementations, the biases to be applied to the activations of items in the support set may have significantly negative values that greatly reduce values of the activations.

Alternatively, activations of items that are not in the support set may be modified in any other manner to qualitatively or quantitatively distinguish such activations from those of items that are in the support set.

At box 360, the masking component provides the activations of the items that are in the support set and the activations of the items that are not in the support set to a SoftMax layer of the machine learning model.

At box 365, the SoftMax layer of the machine learning model generates scaled probabilities for items that are in the support set and probabilities of zero for items that are not in the support set based on the activations. For example, a layer of the machine learning model may convert the activations received from the masking component into a probability distribution across multiple classes, such that the final output of the machine learning model represents probabilities that an image depicts one of the items within the support set, and does not represent any probabilities that the image depicts an item outside of the support set.

At box 370, an inference is drawn based on the probabilities generated by the SoftMax layer, and the process ends. For example, the image may be determined to depict an item of the support set corresponding to a highest value of the probabilities generated by the SoftMax layer.

Figure 4A:
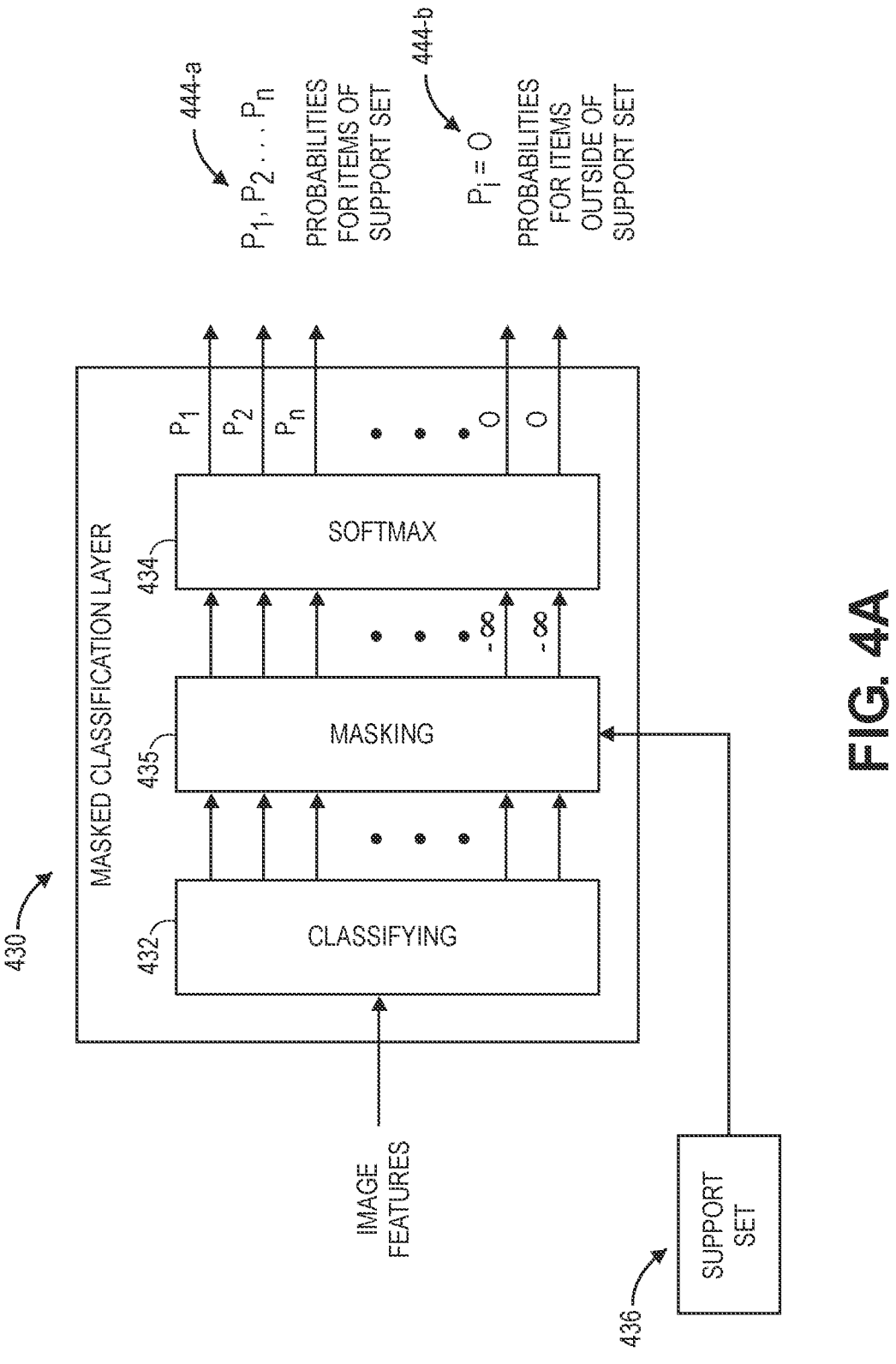
FIGS. 4A and 4B are views of aspects of one system for image recognition in accordance with embodiments of the present disclosure.
Figure 4B:
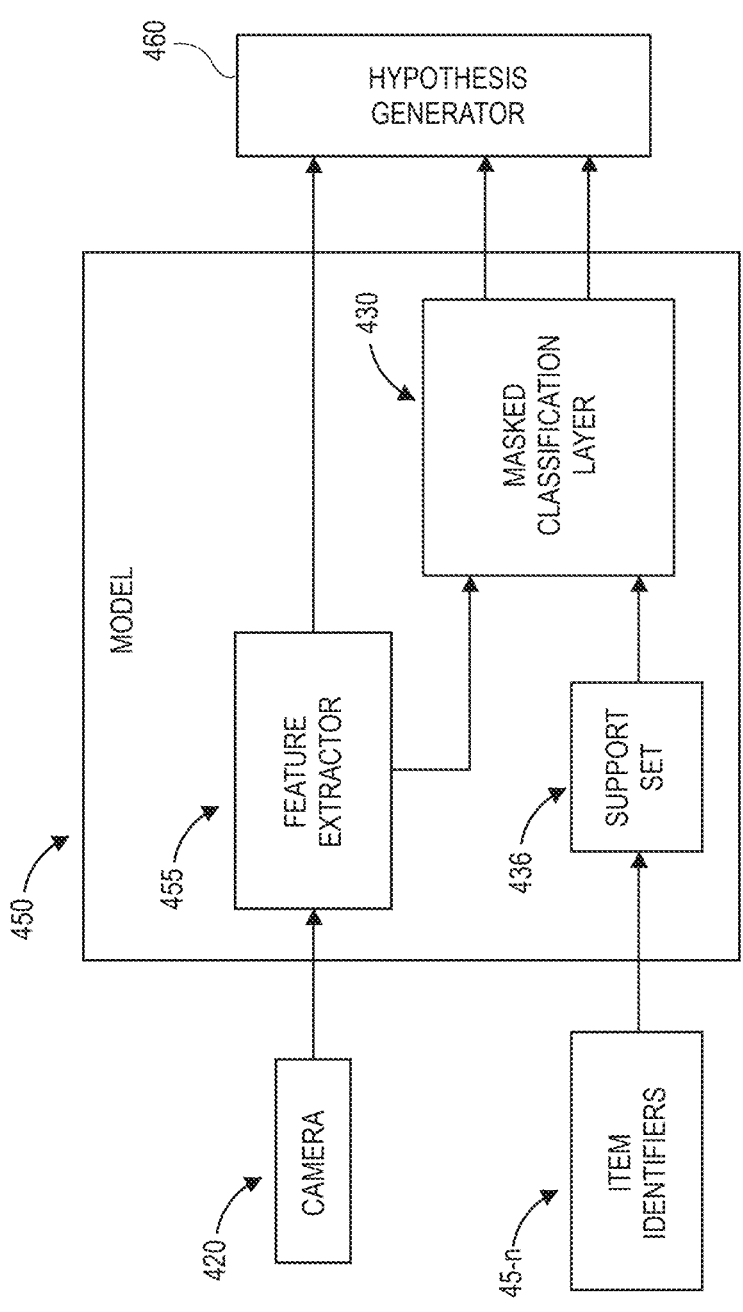

Masked classification layers of the present disclosure may be utilized in connection with any type or form of image recognition application. Referring to FIGS. 4A and 4B, views of aspects of one system for image recognition in accordance with embodiments of the present disclosure are shown. Except where otherwise noted, reference numerals preceded by the number "4" shown in FIGS. 4A and 4B indicate components or features that are similar to components or features having reference numerals preceded by the number "2" shown in FIG. 2 or by the number "1" shown in FIGS. 1A through 1I.

As is shown in FIG. 4A, a masked classification layer 430 includes one or more classifying layers 432, a masking component 435 and a SoftMax layer 434. The classifying layers 432 may be any component or portion of a machine learning model, e.g., a multi-layer perceptron network, that is configured to process features derived from images captured by one or more cameras and to generate activations representative of such features or such images.

The masking component 435 may be any component or component or portion of a machine learning model, e.g., the masked classification layer 430, that is configured to receive activations from another component or portion of the machine learning model, e.g., the classifying layers 432, to determine whether such activations correspond to members of a support set, and to modify or convert activations that do not correspond to members of the support set to different values, e.g., negative numbers that are large in value, such as negative infinity. The masking component 435 may then transfer activations corresponding to members of the support set, and modified or converted activations that do not correspond to members of the support set, to another component or portion of the machine learning model, e.g., the SoftMax layer 434, to generate a probability distribution therefrom.

The SoftMax layer 434 may be any component or portion of a machine learning model, e.g., the masked classification layer 430, that is configured to execute a function, e.g., a SoftMax function, or a smooth approximation of an arguments of the maxima (or "arg max") function, for converting or scaling a set of real values into a vector of real values (e.g., probabilities) that sum to one, or a probability distribution. For example, in a multi-classification problem, the SoftMax layer 434 may assign probabilities 444-$a$ to each of the classes of items in the support set, e.g., in decimals, and a sum of the probabilities 444-$a$ adds to one, while also assigning probabilities 444-$b$ to each of the classes of items that are not in the support set, such that each of the probabilities 444-$b$ has a value of zero.

The masked classification layer 430 may be incorporated into any aspect of an image recognition application, or into any machine learning model or models for performing image recognition functions. As is shown in FIG. 4B, the masked classification layer 430 is provided in a machine learning model 450 having a feature extractor 455. The feature extractor 455 may be a portion or component of the machine learning model 450, e.g., a backbone, that is programmed or configured to extract features from images (e.g., characteristics of the images, or properties or other attributes of the images) received from a camera 420, or images that were previously captured, or to dimensionally reduce the images to a linear combination representing such characteristics, properties or attributes. The feature extractor 455 may execute any algorithms or techniques for extracting features, such as an artificial neural network, an autoencoder, or others. The feature extractor 455 may generate features of any size or shape, based on any number of images received from the camera 420. For example, the feature generator 455 may generate features from a set of images having any number, which may be defined by a frame rate of the camera 420 and a period of time, e.g., one second. In some implementations, the feature extractor 455 may generate a vector having any number of features, e.g., sixteen features, or another number of features that may be distributed over any duration. The features generated by the feature extractor 455 are provided to the masked classification layer 430 and may also be utilized for any other purpose.

Additionally, a set of item identifiers 45-$n$, e.g., labels of classes of items, or individual items, are provided to the machine learning model 450 to generate a support set 436 for the masked classification layer 430. The set of item identifiers 45-$n$ may include items that are likely to be present within a field of view of the camera 420, or are likely to be depicted within images captured by the camera 420, and may be identified or selected in any manner or on any basis.

Outputs received from the masked classification layer 430, which may include identifiers of classes and confidence scores or other metrics associated with such classes, may be provided to a hypothesis generator 460 along with features generated by the feature extractor 455, and utilized to generate a hypothesis of one or more events depicted within the images from which the features were generated, or for any other purpose.

In accordance with implementations of the present disclosure, any system having one or more computer processors may be programmed with one or more sets of instructions that, when executed, cause the system to execute the machine learning model 450, the masked classification layer 430 or any other components of the present disclosure. In some implementations, for example, the machine learning model 450, the masked classification layer 430 or any other components described herein may be executed by one or more computer processors provided on a computer system in communication with one or more cameras, e.g., to process images captured by such cameras. In some other implementations, however, the machine learning model 450, the masked classification layer 430 or any other components described herein may be executed by one or more computer processors provided on a camera or another imaging device, e.g., to process images captured by the camera or the other imaging device.

The systems and methods of the present disclosure are not limited to techniques for image recognition. Any type of data may be processed into feature vectors and utilized to train a machine learning model for any purpose. Subsequently, a support set of classes may be identified, and a masking component may be trained to modify activations corresponding to classes that are not in the support set to significantly large negative numbers, e.g., negative infinity, prior to generating a probability distribution from such classes. The data from which the feature vectors are generated need not be limited to images.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:

a camera; and a computer system in communication with the camera, wherein the computer system is programmed with one or more sets of instructions that, when executed by the computer system, cause the computer system to execute a method comprising:

identifying a training data set, wherein the training data set comprises a first set of images and a first set of labels, wherein each of the first set of labels corresponds to a class of objects including at least one of the first set of images depicting one of the objects of the class;

training a machine learning model to recognize objects depicted within images, wherein the machine learning model comprises a masking component and a plurality of layers, and wherein training the machine learning model comprises:

providing at least some of the first set of images as training inputs to the machine learning model, wherein each of the training inputs comprises one of the first set of images;

receiving training outputs from the machine learning model in response to the training inputs, wherein each of the training outputs is received in response to one of the first set of images; and adjusting at least one weight of at least one connection between a node of a first one of the plurality of layers and a node of a second one of the plurality of layers based at least in part on a difference between one of the training outputs received in response to one of the first set of images and one of the first set of labels corresponding to the class of objects;

programming the masking component of the machine learning model with identifiers of a plurality of items;

receiving at least a first image from the camera;

providing at least a portion of the first image to the machine learning model;

identifying a plurality of activations received from the machine learning model in response to the portion of the first image, wherein each of the plurality of activations corresponds to one of a plurality of classes of objects;

determining that each of a first subset of the plurality of activations corresponds to one of the plurality of items;

determining that each of a second subset of the plurality of activations does not correspond to one of the plurality of items;

adjusting each of the second subset of the plurality of activations to a value of negative infinity;

generating a probability distribution based at least in part on the first subset of the plurality of activations and the second subset of the plurality of activations; and determining that the first image depicts an object in one of the classes of objects based at least in part on the probability distribution.

2. The system of claim 1, wherein the camera is provided within a materials handling facility, and wherein each of the plurality of items is available at the materials handling facility.

3. The system of claim 1, wherein the machine learning model comprises a convolutional neural network.

4. The system of claim 1, wherein the method further comprises:

detecting a location of at least one hand depicted within the first image; and cropping the first image about the location of the at least one hand, wherein the portion of the first image is the cropped first image.

5. The system of claim 1, wherein generating the probability distribution comprises:

providing each of the first subset of the plurality of activations and the second subset of the plurality of activations to a layer of the machine learning model configured to execute a SoftMax function.

6. A method comprising:

providing at least a first image as a first input to a first component of a machine learning model, wherein the first component comprises an input layer, an output layer, and at least one middle layer between the input layer and the output layer;

receiving a first plurality of activations as first outputs in response to the first input, wherein each of the first plurality of activations is generated by the output layer of the first component;

determining, by a second component of the machine learning model, that each of a first subset of the first plurality of activations corresponds to one of a plurality of items in a set;

determining, by the second component, that each of a second subset of the first plurality of activations does not correspond to any of the plurality of items in the set;

setting, by the second component, each of the second subset of the first plurality of activations to a predetermined negative value;

generating, by a third component of the machine learning model, a probability distribution based at least in part on the first subset of the first plurality of activations and the second subset of the first plurality of activations; and determining that the first image depicts one of the plurality of items in the set based at least in part on the probability distribution.

7. The method of claim 6, further comprising:

receiving, by a computer system, at least the first image from at least one camera over one or more networks, wherein the computer system is programmed with one or more instructions for executing the machine learning model, wherein the at least one camera is provided within a materials handling facility.

8. The method of claim 7, wherein receiving at least the first image from the at least one camera over the one or more networks comprises:

receiving, by the computer system, a plurality of images from the at least one camera over the one or more networks;

detecting, by the computer system, locations of at least one hand depicted within each of the plurality of images; and cropping, by the computer system, each of the plurality of images about the locations of the at least one hand, wherein providing at least the first image as the first input to the first component of the machine learning model comprises:

providing each of the plurality of cropped images as the first input to the first component of the machine learning model, wherein the first image is one of the plurality of cropped images.

9. The method of claim 7, wherein at least one storage unit having the plurality of items in the set is within a field of view of the at least one camera.

10. The method of claim 6, wherein the second component is a masking component, and wherein the method further comprises:

programming the second component with identifiers of each of the plurality of items in the set.

11. The method of claim 6, wherein the first component is a convolutional neural network.

12. The method of claim 11, further comprising:

generating, by the first component, a first set of features, wherein each of the first set of features relates to at least one characteristic of at least the first image, and wherein each of the first plurality of activations is generated based at least in part on the first set of features.

13. The method of claim 6, further comprising:

prior to providing at least the first image as the first input to the first component, providing a plurality of sets of images as inputs to the first component, wherein each of the sets of images depicts an object within one of a plurality of classes;

receiving a plurality of outputs from the first component, wherein each of the plurality of outputs is received in response to one of the plurality of sets of images depicting an object within one of the plurality of classes as an input; and training the first component based at least in part on a difference between one of the plurality of outputs received in response to one of the plurality of sets of images depicting an object in the one of the plurality of classes and a label of the one of the plurality of classes.

14. The method of claim 6, wherein the third component is a layer configured to execute a SoftMax function on the first plurality of activations.

15. The method of claim 6, wherein the predetermined negative value is negative infinity.

16. A server comprising at least one processor and at least one data store, wherein the server is in communication with a camera, and wherein the server is programmed with one or more sets of instructions that, when executed by the at least one processor, cause the server to at least:

receive at least a first image from the camera;

provide at least the first image as a first input to at least one classifying layer of a machine learning model, wherein the at least one classifying layer comprises an input layer, an output layer, and at least one middle layer between the input layer and the output layer;

receive a first plurality of activations as first outputs in response to the first input, wherein each of the first plurality of activations is generated by the output layer of the at least one classifying layer;

determine, by a masking component of the machine learning model, that each of a first subset of the first plurality of activations corresponds to one of a plurality of items in a set;

determine, by the masking component, that each of a second subset of the first plurality of activations does not correspond to any of the plurality of items in the set;

set, by the masking component, each of the second subset of the first plurality of activations to a predetermined negative value;

generate, by a SoftMax layer of the machine learning model, a probability distribution based at least in part on the first subset of the first plurality of activations and the second subset of the first plurality of activations; and identify an item depicted within at least the first image based at least in part on the probability distribution, wherein the item is one of the plurality of items in the set.

17. The server of claim 16, wherein the at least one classifying layer is at least one layer of a convolutional neural network.

18. The server of claim 16, wherein the one or more sets of instructions, when executed by the at least one processor, further cause the server to at least:

identify at least one item within a field of view of the camera, wherein the at least one item within the field of view of the camera is at least one of the plurality of items in the set.

19. The server of claim 16, wherein the predetermined negative value is negative infinity.

20. The server of claim 16, wherein the one or more sets of instructions, when executed by the at least one processor, further cause the server to at least:

provide a plurality of sets of images as inputs to the masking component, wherein each of the sets of images depicts an item within one of a plurality of classes, and wherein the plurality of sets of images are provided as inputs to the masking component prior to providing at least the first image as the first input to the at least one classifying layer;

receive a plurality of outputs from the masking component, wherein each of the plurality of outputs is received in response to one of the plurality of sets of images depicting an item within one of the plurality of classes as an input; and train the masking component based at least in part on a difference between one of the plurality of outputs received in response to one of the plurality of sets of images depicting an item within the one of the plurality of classes and a label of the one of the plurality of classes.

* * * * *